Oct. 10, 1950     B. B. SCHULTE     2,525,729
DEVICE FOR TEACHING MUSIC
Filed June 24, 1948     2 Sheets-Sheet 1
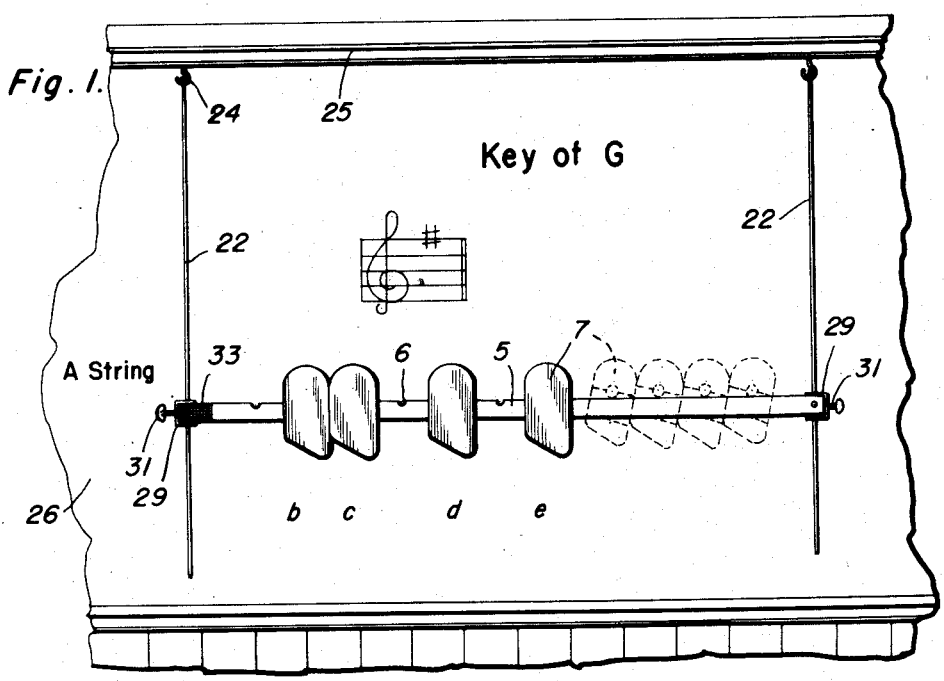
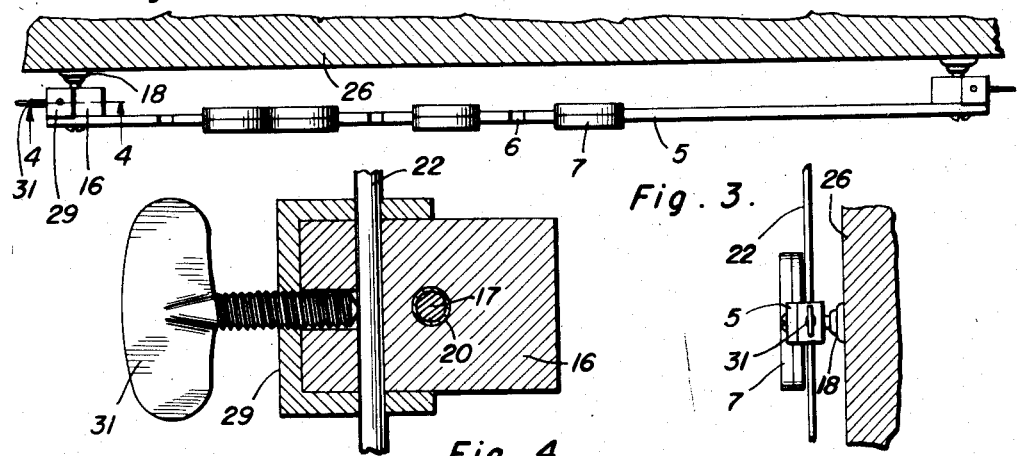
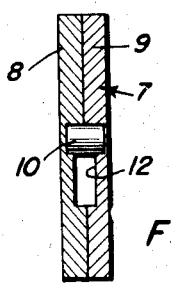
Betty B. Schulte
INVENTOR.

Oct. 10, 1950 B. B. SCHULTE 2,525,729
DEVICE FOR TEACHING MUSIC
Filed June 24, 1948 2 Sheets-Sheet 2

Betty B. Schulte
INVENTOR.

BY *Clarence A. O'Brien*
*and Harvey B. Jackson*
Attorneys

Patented Oct. 10, 1950

2,525,729

UNITED STATES PATENT OFFICE 2,525,729

DEVICE FOR TEACHING MUSIC

Betty B. Schulte, East Hampton, N. Y.

Application June 24, 1948, Serial No. 34,931

6 Claims. (Cl. 84—471)

The present invention relates to new and useful improvements in devices for use in teaching music and more particularly to a classroom instruction device for use in facilitating and expediting the teaching of stringed instruments, such as the violin, viola and cello.

An important object of the invention is to provide a mechanical device which will enable a student to visualize the various finger positions upon the string of an instrument and providing means for supporting the device upon a blackboard, wall or other supporting structure whereby a group of students may be simultaneously instructed.

A further object of the invention is to provide a group of fingering position indicating blocks slidably mounted on a horizontal bar with a stop means to hold the blocks in various fingering positions corresponding to fingering of the string of an instrument and constructing the blocks whereby the same may be stored at one end of the bar when not in use, and in a manner whereby the same will not be confused with the blocks when placed in their finger indicating positions.

A still further object is to provide a device of this character which may be easily and quickly attached in position to a blackboard or other supporting structure and removed therefrom and stored in compact form when not in use.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view showing the teaching device supported in position for use;

Figure 2 is a top plan view;

Figure 3 is an end elevational view;

Figure 4 is an enlarged sectional view taken substantially on a line 4—4 of Figure 2;

Figure 8 is a vertical sectional view taken substantially on a line 8—8 of Figure 7.

Figure 5:
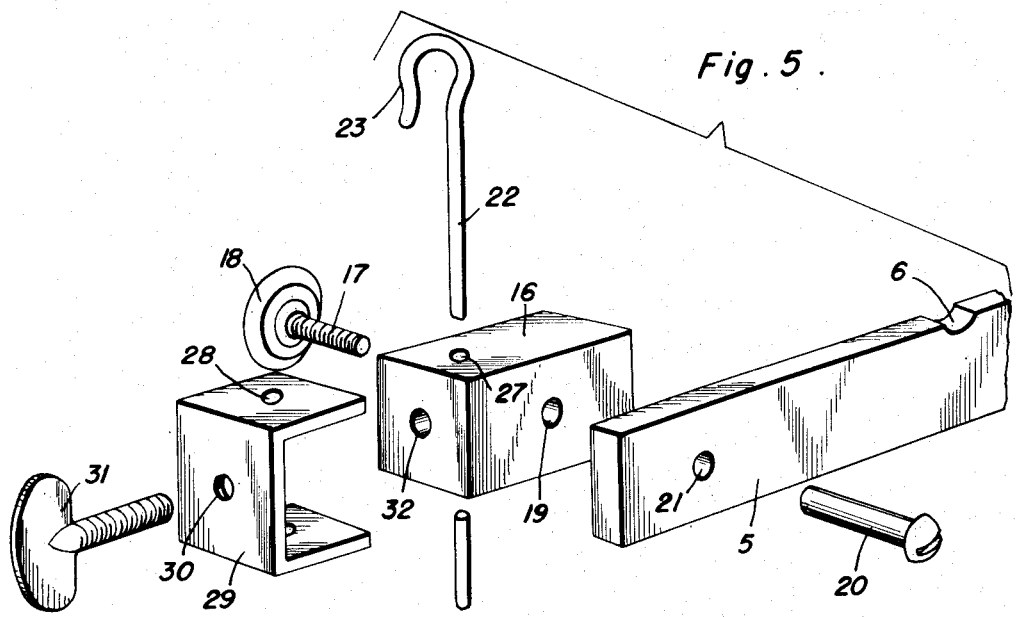
Figure 5 is an enlarged group perspective view of the vertically adjustable supporting means or one end of the bar.

Referring now to the drawings in detail wherein for the purpose of illustration I have disclosed a preferred embodiment of the invention the numeral 5 designates a bar which is preferably of rectangular shape in cross section and having notches 6 in its upper edge at predetermined spaced apart intervals, the notches being grouped toward one end of the bar. A plurality of finger position indicating blocks 7 are slidably mounted on bar 5, the blocks being constructed of a pair of flat block sections 8 and 9 secured to each other in confronting relation by a dowel pin received in openings 11 substantially at the center of the block sections. The confronting faces of the block sections are formed with horizontal grooves 12 which are bisected by the upper edge of the groove to expose the lower portion of the dowel in the groove.

Figure 6:
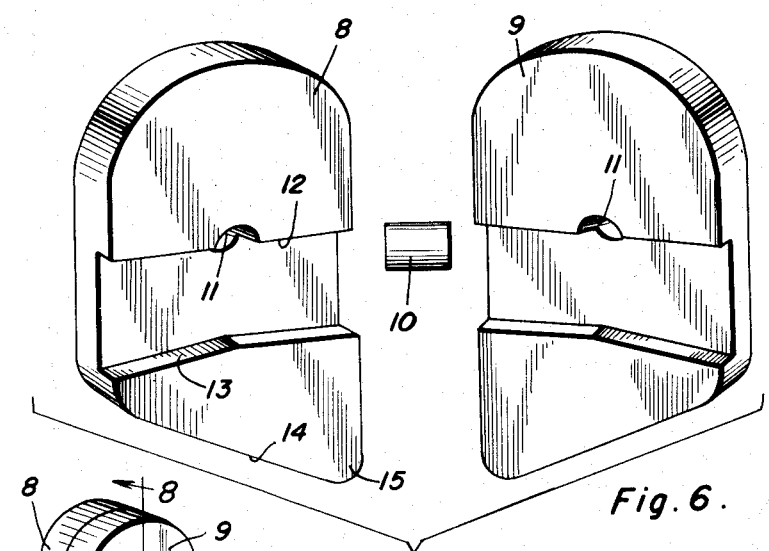
Figure 6 is a similar view of one of the fingering position indicating blocks.
Figure 7:
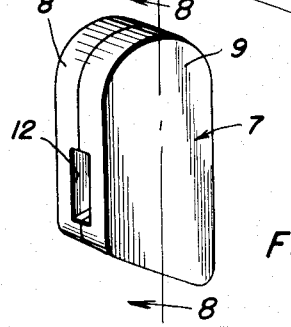
Figure 7 is a perspective view of one of the blocks.

The lower edge of the groove 12 slopes toward one edge of the block from a point adjacent the center thereof as shown at 13 whereby to gradually increase the width of the groove at one edge of the block. The lower edge of the block sections 8 and 9 slope in an opposite direction to the slope 13 of groove 12, as shown at 14 to provide a counter-balancing lower corner 15 at an edge of the block opposite the sloping portion 13 of the groove as shown more clearly in Figure 6 of the drawings.

The blocks 7 are slidable on the bar 5 to selectively enter the dowels 10 in the notches 6 and when so positioned the blocks will be supported in a perpendicular position as shown by the full lines in Figure 1 of the drawings.

When the blocks 7 are moved toward the plain end of the bar 5 not provided with the notches 6 so that the dowel 10 will not be engaged in any of the notches the counter-balanced corner 15 of the blocks will tilt the blocks as shown by the dotted lines in Figure 1 to represent a stored position of the blocks.

A block 16 of wood or other suitable material is secured to each end of bar 5 by means of a threaded stud 17 having one end embedded in a rubber suction cup 18 and freely positioned in an opening 19 extending from front to rear of block 16. An internally threaded tapped or cap screw 20 is inserted through an opening 21 in bar 5 and into opening 19 in block 16 for threading on the stud 17.

The block 16 at each end of bar 5 is slidable vertically on a hanger rod 22 having a hook 23 at its upper end engaging a screw hook 24 secured to the underside of the top rail 25 of a blackboard 26 or other suitable supporting structure. The hanger rod 22 extends through a vertical opening 27 in block 16 and also through aligned openings 28 in a U-shaped wear support 29 positioned on one end of block 16.

The outer end of U-shaped support 29 is formed with a tapped opening 30 in which a thumb screw 31 is threaded for loosely entering an opening 32 in block 16 to engage hanger rod 22 whereby to support the block 16 in vertically adjusted positions on the hanger rod.

In the operation of the device the bar 5, which represents one of the strings of a stringed musical instrument is supported in a vertically adjusted position on hanger rod 22 by means of block 16 and thumb screw 31. The suction cup 18 holds the bar 5 firmly against the surface of the blackboard 26.

In the present embodiment of the invention the signature for the key of G is written on the black board as shown in Figure 1 and with the bar 5 representing "A" string. The students then move the blocks 7 along the bar until they are in the correct fingering position for the note on the "A" string in the key of G and the blocks anchored in such position by entering the dowels 10 in the notches 6 of the bar.

The end of the bar 5 provided with the notches 6 is also colored in a contrasting color as shown at 33 to represent the saddle end of the violin or the stringed instrument.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A device for teaching the fingering positions of stringed instruments and comprising an elongated horizontal member representing a string of a musical instrument, a hanger supporting the member from an overhead support, means connecting the elongated member to the hanger for vertical adjustment of said member, means carried by said first-named means holding the member immovable against a fixed vertical surface of the support and objects carried by the member for movement longitudinally thereof to indicate fingering positions of the string.

2. A device for teaching the fingering positions of stringed instruments and comprising an elongated member representing a string of a musical instrument, hanger rods adjustably supporting the ends of the member from an overhead support, means projecting rearwardly from the member holding the same immovable against a fixed vertical surface of the support and objects slidably mounted on the member to indicate fingering positions of the string.

3. A device for teaching the fingering positions of stringed instruments and comprising an elongated member representing a string of a musical instrument, supporting means for the member holding the same in a horizontal position, objects slidably mounted on the member to indicate fingering positions of the string, stop means on the member holding the objects in fingering position, and means carried by the objects tiltably supporting the same on the member for automatically assuming a distinguishing pose when not held by said stop means.

4. A device for teaching the fingering positions of stringed instruments and comprising an elongated member representing a string of a musical instrument, supporting means for the member holding the same in a horizontal position, finger position indicating members slidably and rockably mounted on said elongated member, and stop means holding said indicating members slidably stationary, and in an upright position on the elongated member, said indicating member automatically rocking into an inclined position when free of the stop means.

5. A device for teaching the fingering positions of stringed instruments and comprising an elongated member representing a string of a musical instrument, supporting means for the member holding the same in a horizontal position, finger position indicating members slidably and rockably mounted on said elongated member, and stop means holding said indicating members slidably stationary, and in an upright position on the elongated member, said indicating member automatically rocking into an inclined position when free of the stop means, said stop means comprising notches in the upper edge of the elongated member and a pin carried by the position indicating members for seating in said notches.

6. A device for teaching the fingering positions of stringed instruments and comprising a bar having notches in one edge, means at each end of the bar supporting the bar in a vertically adjusted horizontal position in front of a supporting structure, means carried by the bar holding the bar in firmly adjusted position to the structure, said bar representing a string of a stringed musical instrument, and finger position indicating blocks slidably and rockably mounted on the bar, said blocks including pins for seating in said notches to hold the blocks stationary and in an upright position on the bar, said blocks rocking on the pins into an inclined position when the pins are free of the notches.

BETTY B. SCHULTE.

REFERENCES CITED

The following references are of record in the file of this patent:

UNITED STATES PATENTS

| Number | Name | Date |
|---|---|---|
| 271,749 | Stewart | Feb. 6, 1883 |
| 736,203 | Brunner | Aug. 11, 1903 |
| 1,136,481 | Ostrovsky | Apr. 20, 1915 |
| 1,821,516 | Hohn | Sept. 1, 1931 |
| 1,953,532 | Creel | Apr. 3, 1934 |
| 2,020,991 | Brody | Nov. 12, 1935 |

FOREIGN PATENTS

| Number | Country | Date |
|---|---|---|
| 154,917 | Germany | Oct. 20, 1904 |